US007933164B2

(12) United States Patent
Ferber et al.

(10) Patent No.: US 7,933,164 B2
(45) Date of Patent: Apr. 26, 2011

(54) USING TOWED SEISMIC SURVEYS THAT DO NOT HAVE COINCIDING STREAMER POSITIONS IN THE TIME LAPSE ANALYSIS OF A PRODUCING FIELD

(75) Inventors: Ralf Ferber, Horsham (GB); Stephen Pickering, Hampton (GB); Robin Charles Walker, Burgess Hill (GB)

(73) Assignee: WesternGeco L.L.C., Houston, TX (US)

( * ) Notice: Subject to any disclaimer, the term of this patent is extended or adjusted under 35 U.S.C. 154(b) by 30 days.

(21) Appl. No.: 12/113,041

(22) Filed: Apr. 30, 2008

(65) Prior Publication Data
US 2009/0274004 A1 Nov. 5, 2009

(51) Int. Cl.
*G01V 1/38* (2006.01)
(52) U.S. Cl. ........................................................ 367/20
(58) Field of Classification Search .............. 367/15–20
See application file for complete search history.

(56) References Cited

U.S. PATENT DOCUMENTS

| 4,376,301 | A | 3/1983 | Roberts |
| 5,761,152 | A | 6/1998 | Jacobsen et al. |
| 7,080,607 | B2 | 7/2006 | Hillesund et al. |
| 2005/0188908 | A1 | 9/2005 | Hillesund et al. |
| 2005/0243648 | A1 | 11/2005 | Kinkead |
| 2006/0285435 | A1* | 12/2006 | Robertsson ............... 367/24 |
| 2008/0015783 | A1 | 1/2008 | Robertsson et al. |

FOREIGN PATENT DOCUMENTS
WO  2005114258 A  12/2005

OTHER PUBLICATIONS

Brain et al., "Time-lapse seismic swaths prove cost-effective alternative to full-field 4D", Offshore, May 2007, http://www-static.shell.com/static/innovation/downloads/innovation/news_publications/cost_effectiveness_time_lapse_seismic_offshore_may2007.pdf.*
Geotrace, "4D Case Study over Draugen Field", Aug. 2007.*
Brain et al. "Time-lapse seismic swaths prove cost effective alternative to full-field 4D", Offshore May 2007.*
Osdal et al. "Time Will Tell: New Insignts from Time-Lapse Seismic Data", Oilfield Review, 2004.*
PCT Search Report, dated Dec. 16, 2009 for Application No. PCT/US2009/042374.

* cited by examiner

*Primary Examiner* — Jack Keith
*Assistant Examiner* — Krystine Breier (57) ABSTRACT

A technique includes performing at least one intervening towed seismic survey after a prior towed seismic survey and before a future towed seismic survey. The prior towed seismic survey has associated first streamer positions, and the future towed seismic survey has associated second streamer positions that do not coincide with the first streamer positions. The technique includes using measurements that are acquired in the intervening towed seismic survey(s) to link the prior towed seismic survey to the future towed seismic survey for time lapse analysis involving the prior and future towed seismic surveys.

12 Claims, 11 Drawing Sheets

USING TOWED SEISMIC SURVEYS THAT DO NOT HAVE COINCIDING STREAMER POSITIONS IN THE TIME LAPSE ANALYSIS OF A PRODUCING FIELD

BACKGROUND

The invention generally relates to using towed seismic surveys that do not have coinciding streamer positions in the time lapse analysis of a producing field.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes performing at least one intervening towed seismic survey after a prior towed seismic survey and before a future towed seismic survey. The prior towed seismic survey has associated first streamer positions, and the future towed seismic survey has associated second streamer positions that do not coincide with the first streamer positions. The technique includes using measurements that are acquired in the intervening towed seismic survey(s) to link the prior towed seismic survey to the future towed seismic survey for time lapse analysis involving the prior and future towed seismic surveys.

In another embodiment of the invention, a technique includes receiving first, second and third sets of seismic data. The first set of seismic data is indicative of measurements of a producing field acquired in a first towed seismic survey that has associated first streamer positions. The second set of seismic data is indicative of measurements of the producing field acquired in a second towed seismic survey that has associated second streamer positions that do not coincide with the first streamer positions. The third set of seismic data is indicative of measurements of the producing field acquired in at least one intervening towed seismic survey conducted after the first towed seismic survey and before the second towed seismic survey. The intervening towed seismic survey(s) have associated streamer positions that coincide with the first and second streamer positions. The technique includes processing the first, second and third sets of seismic data in a time lapse analysis of the producing field.

In yet another embodiment of the invention, a technique includes obtaining a first set of seismic data, which is indicative of measurements acquired in at least one intervening towed seismic survey conducted after a prior towed seismic survey that has associated first streamer positions and before a future towed seismic survey that has associated second streamer positions that do not coincide with the first streamer positions. The technique includes processing the first set of seismic data to generate a second set of seismic data, which is indicative of measurements acquired in at least one virtual towed seismic survey that has associated streamer positions that coincide with the first and second streamer positions.

Advantages and other features of the invention will become apparent from the following drawing, description and claims.

DETAILED DESCRIPTION

Figure 1:
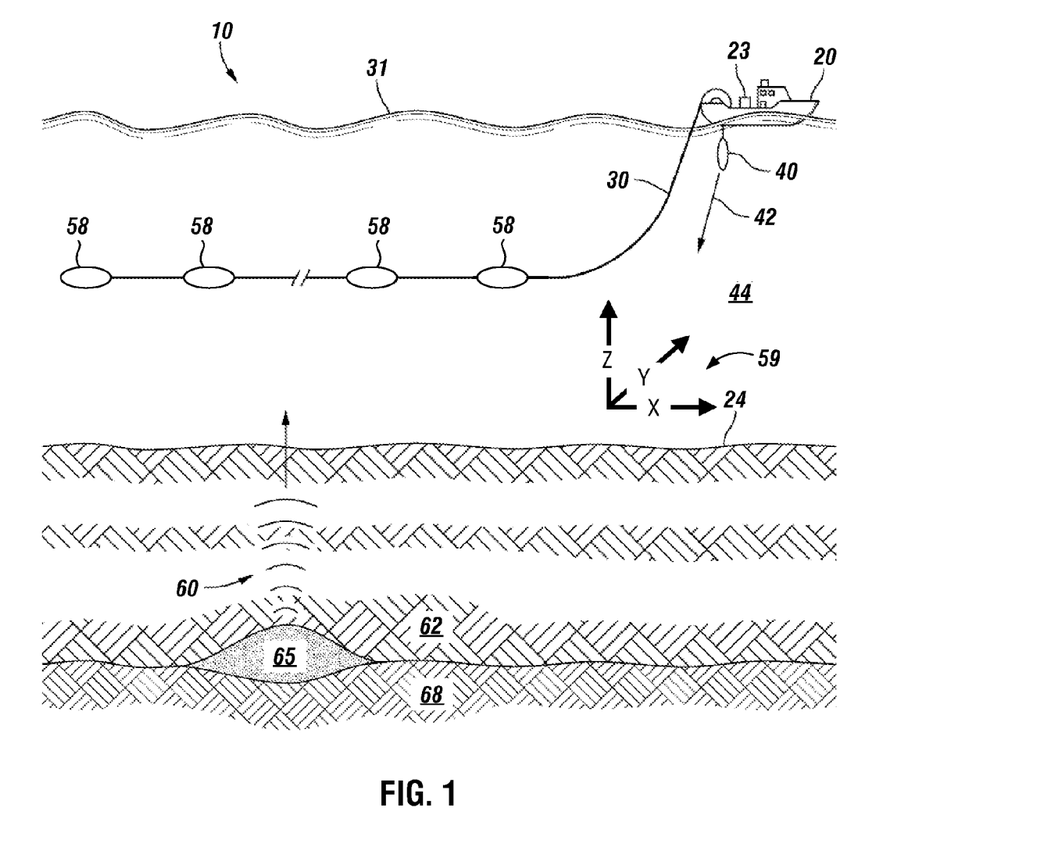
FIG. 1 is a schematic diagram of a marine-based seismic data acquisition system according to an embodiment of the invention.

FIG. 1 depicts an embodiment 10 of a marine seismic data acquisition system in accordance with some embodiments of the invention. In the system 10, a survey vessel 20 tows seismic streamers 30 behind the vessel 20. The streamers 30 may be arranged in a spread of streamers 30 such that the spread is ideally contained within a horizontal plane during the survey. Thus, FIG. 1 depicts a side view of such a streamer spread in accordance with some embodiments of the invention. It is noted that the streamer spread may take on other geometries, in accordance with other embodiments of the invention. For example, the streamer spread may be slanted to some degree, which causes some of the streamers to be towed at different depths. As another example, in accordance with other embodiments of the invention, the streamer spread may be arranged in arrays of streamers, which are towed at different depths, such as an over/under streamer spread, for example. Thus, many variations are contemplated and are within the scope of the appended claims.

The seismic streamers 30 may be several thousand meters long and may contain various support cables (not shown), as well as wiring and/or circuitry (not shown) that may be used to support communication along the streamers 30. Each seismic streamer 30 contains seismic sensors 58, which record seismic signals. In accordance with some embodiments of the invention, the seismic sensors 58 are hydrophones, which acquire measurements of a pressure wavefield. In accordance with other embodiments of the invention, the seismic sensors 58 may be multi-component seismic sensors, each of which is capable of detecting a pressure wavefield and at least one component of a particle motion that is associated with acoustic signals that are proximate to the multi-component seismic sensor. Examples of particle motions include one or more components of a particle displacement, one or more components (in-line (x), cross-line (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, or combinations thereof. For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device or may be implemented as a plurality of devices, depending on the particular embodiment of the invention.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and possibly particle motion, depending on the particular embodiment of the invention. The traces are recorded and may be at least partially processed by a signal processing unit 23 that is deployed on the survey vessel 20, in accordance with some embodiments of the invention. For example, a particular multi-component seismic sensor may provide a trace, which corresponds to a measure of a pressure wavefield by its hydrophone; and the multi-component sensor may provide one or more traces that correspond to one or more components of particle motion, which are measured by accelerometers.

Figure 11:
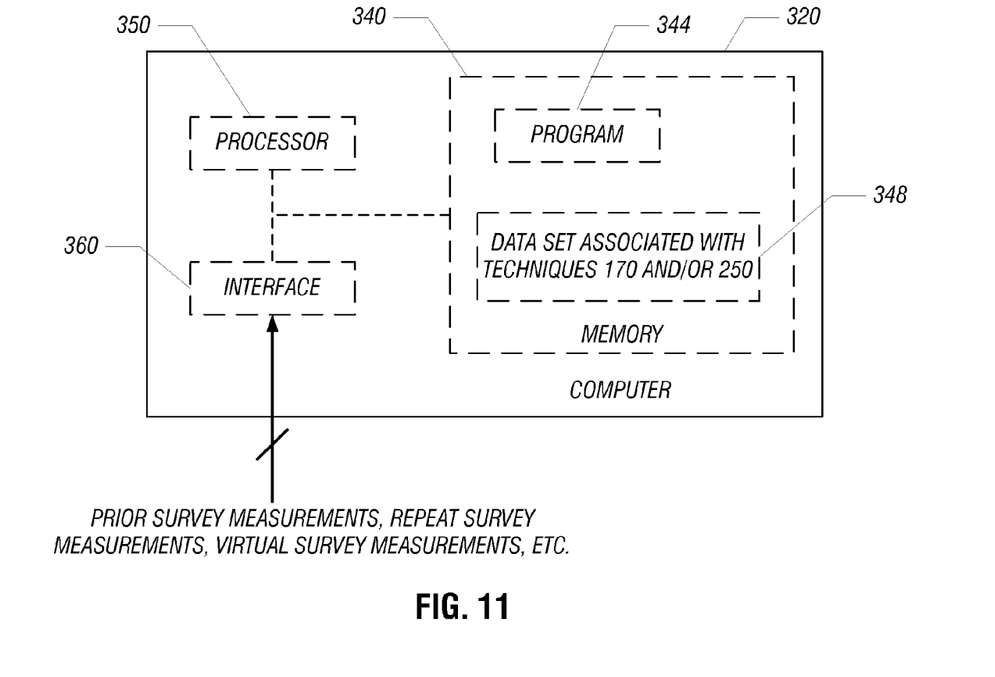
FIG. 11 is a schematic diagram of a processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary processing system 320 that is depicted in FIG. 11, for example) that may be, for example, located on land or on the vessel 20. Thus, many variations are possible and are within the scope of the appended claims.

For purposes of observing changes in a producing field over time, a series of towed seismic surveys of the producing field, separated by months or years, may be conducted. Thus, an initial survey (called "a base survey") may be conducted before or after the well completion equipment is installed, and thereafter, subsequent surveys (called "monitor," or "repeat surveys") are conducted for purposes of observing changes in the producing field. Ideally, the only change between any two of the surveys should be in the fluids (i.e., oil, gas and/or water) that are produced or displaced from the producing field. In time lapse analysis, also called "4-D analysis," differences are taken between the surveys to ideally reveal only the changes in the produced/displaced fluids, with the geology (ideally being the same for each survey) canceling out.

In practical terms, however, many operational issues undermine the assumption that the differencing only reveals the changes in the produced/displaced fluids. For example, changes in tides and currents between sequential surveys may cause the streamer locations (and thus, sensor locations) in each survey to be different and thus, cause the geology to not cancel out. Conventionally, with unsteered streamers, the operational issues cannot be avoided. In the context of this application, "unsteered" means that the lateral (cross-line) positions of the streamers are not precisely controlled to the extent that the towed streamers exhibit significant feathering during the survey (i.e., the streamers depart from the inline, or x, axis (see FIG. 1) by a significant feathering angle). As a result, constant or near constant crossline distances are not maintained between the streamers, and thus, the streamers are not kept parallel to each other during the survey.

Figure 5:
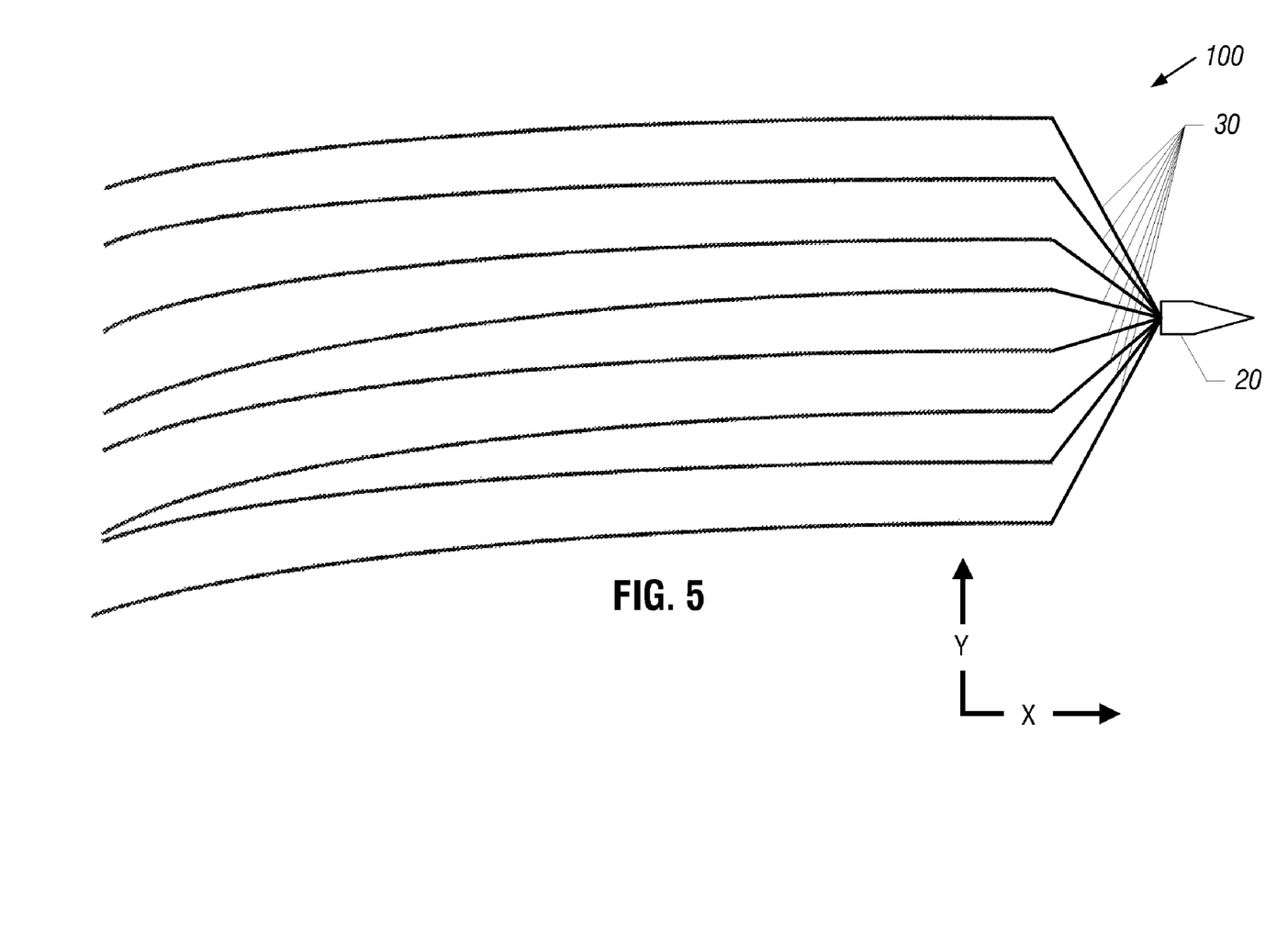
FIG. 5 is an illustration of an exemplary towed seismic survey that has significant streamer feathering according to an embodiment of the invention.

As an example, FIG. 5 depicts a conventional survey 100 that does not employ streamer steering. In the survey 100, the depths of the streamers 30 may generally be controlled, but the lateral positions of the streamers 30 are generally not controlled, which causes the feathering of the streamers 30, thereby resulting in unparallel streamers 30 and non-uniform crossline spacing between the streamers 30.

Figure 4:
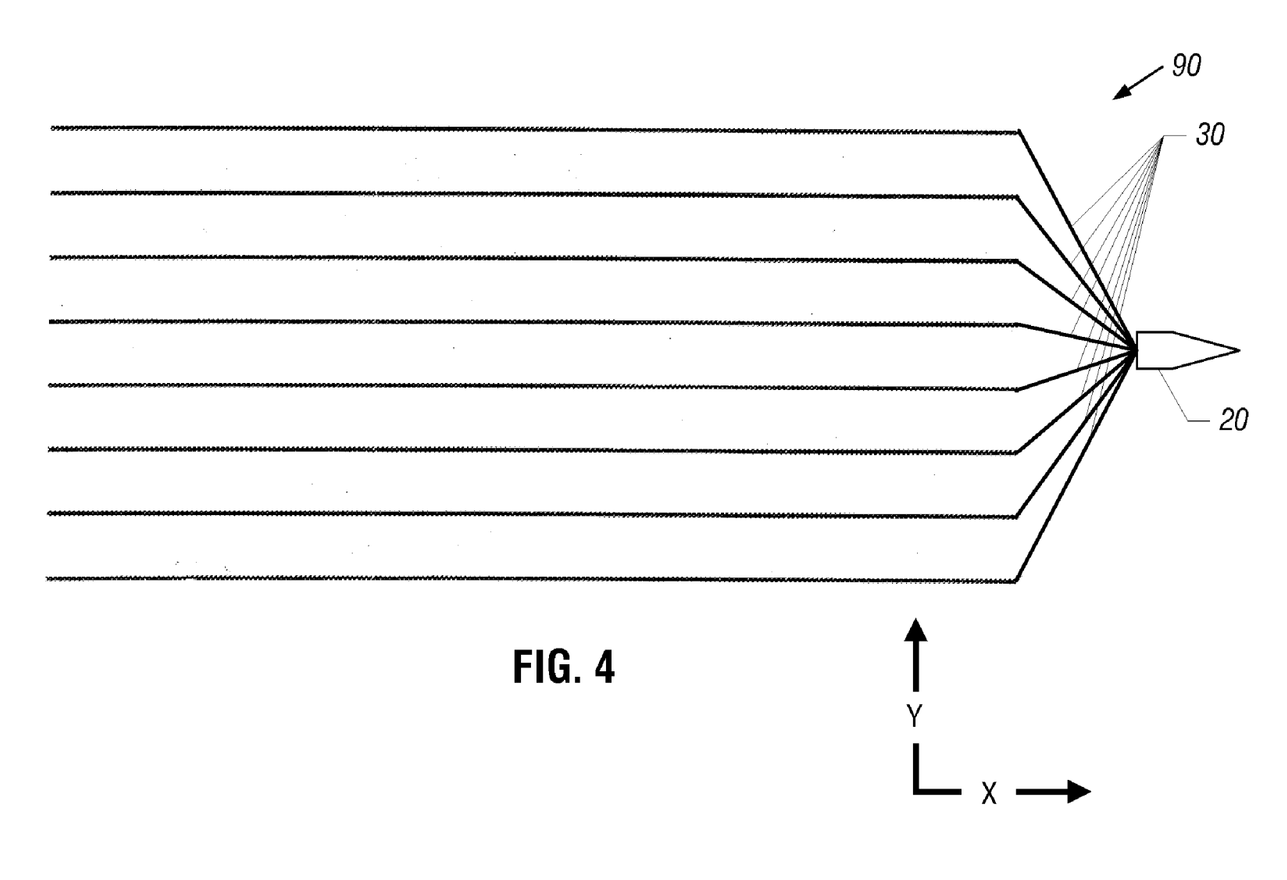
FIG. 4 is an illustration of an exemplary towed seismic survey that has no significant streamer feathering according to an embodiment of the invention.

Due to certain innovations in more recent years, the depth and more importantly, the lateral positions of the streamers 30 may be more precisely controlled due to streamer steering. A survey that employs streamer steering uses steering mechanisms (such as "birds") that may be built into each streamer for purposes of guiding, or steering, the streamer. FIG. 4 depicts an exemplary towed seismic survey 90, which employs streamer steering. As shown, the streamers 30 are kept parallel such that the streamers 30 exhibit very little, if any, feathering. It is noted that even with steering and depth control, the streamers 30 may be slanted along the depth (z) axis.

An exemplary system to steer streamers in connection with a towed seismic survey is described in U.S. Pat. No. 7,080, 607, entitled, "SEISMIC DATA ACQUISITION EQUIPMENT CONTROL SYSTEM," which issued on Jul. 25, 2006, and is hereby incorporated by reference in its entirety.

Certain advantages therefore flow from using steered streamer technology in that a more uniform crossline spacing is maintained; and for purposes of time lapse analysis, it is generally easy to align the streamer positions in a given steered streamer survey with the streamer positions in a prior steered streamer survey.

It is quite possible, however, that although streamer steering technology now exists and may be used for purposes of conducting towed surveys of a particular producing field, the producing field may have been in existence for some time; and therefore, a series of prior non-steered surveys of the producing field may have already been conducted. This situation enables a choice to be made regarding how the future steered surveys are to be conducted: whether the streamers in the future surveys are to be steered to match the previous non-steered surveys; or whether the future surveys are to be conducted in a manner that ignores the previous unsteered surveys, and thus, the first steered survey establishes a better base line survey, i.e., a new "start from fresh" base line survey. The former approach may be labeled a "backwards looking four-dimensional (BL4-D)" approach, in which otherwise nearly perfect surveys are sacrificed to maintain backward compatibility with previous unsteered surveys. The latter approach is a "forward looking 4-D (FL4-D)" approach, in which nearly perfect surveys are conducted at the expense of ignoring the previous survey data to maintain forward looking compatibility with future surveys.

In accordance with embodiments of the invention, which are described herein, surveys and/or processing techniques are employed to link steered and unsteered towed seismic surveys together so that a time lapse analysis of the producing field may be performed from the time at which an original unsteered survey (the base survey, for example) was conducted and through the time at which the most recent steered survey was conducted.

Figure 2:
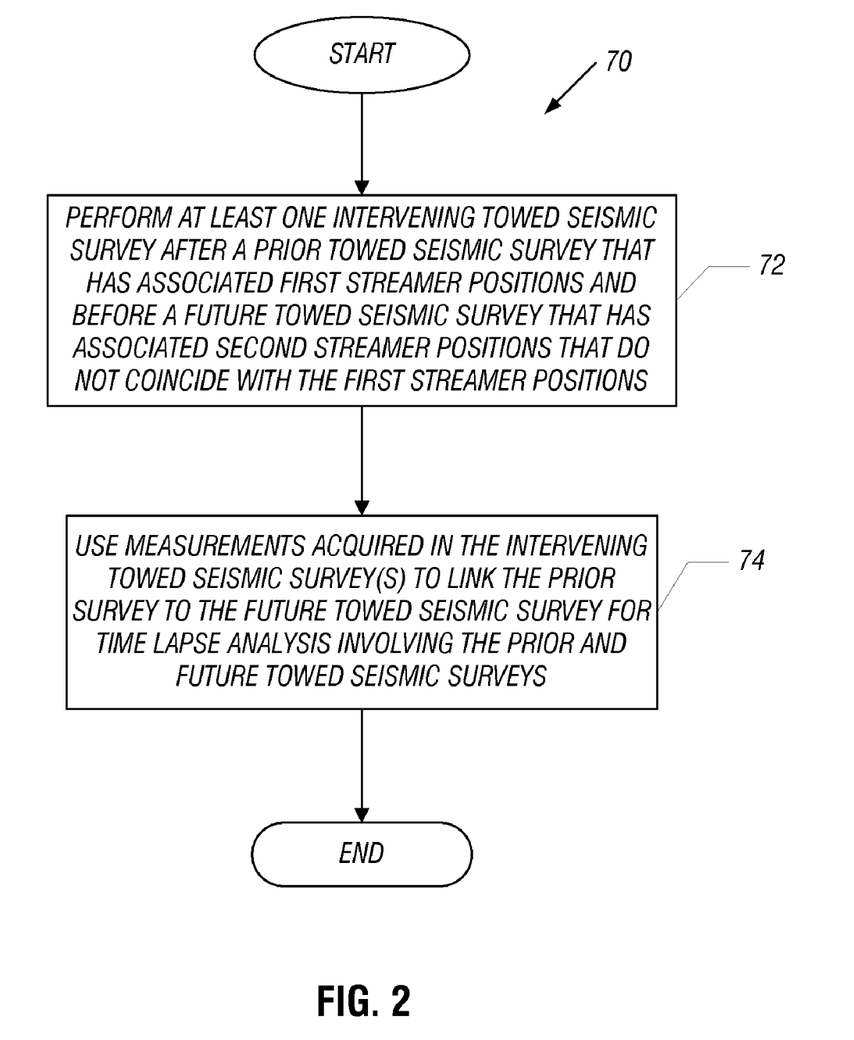
FIGS. 2, 3, 8 and 10 are flow diagrams depicting techniques to link towed seismic surveys that do not have coinciding streamer positions for purposes of time lapse analysis according to embodiments of the invention.

Referring to FIG. 2, more specifically, in accordance with embodiments of the invention, a technique 70 may be used to link a prior towed seismic survey (such as the last unsteered survey of a series of prior unsteered surveys, for example) to a future towed seismic survey (such as the first steered survey of a series of future steered surveys, for example) for purposes of time lapse analysis. It is assumed that the streamer positions associated with the prior towed seismic survey do not coincide with the streamer positions that are associated with the future towed seismic survey. In other words, due to significant differences in the streamer positions, the geology does not cancel out. However, the technique 70 includes performing (block 72) one or more intervening towed seismic surveys, which are conducted in time between the prior towed seismic survey and the future towed seismic survey, and using (block 74) measurements that are acquired in the intervening survey(s) to link the prior and future surveys together so that the geology does not cancel out.

In general, two ways are disclosed herein for purposes of linking the prior and future surveys together pursuant to the technique 70: a first technique in which the intervening survey(s) are conducted in a manner so that the intervening survey(s) become part of the series of surveys for the time lapse analysis; and a second technique in which the measurements acquired by the intervening survey(s) are processed to generate virtual surveys that become part of the series of surveys for the time lapse analysis.

Figure 3:
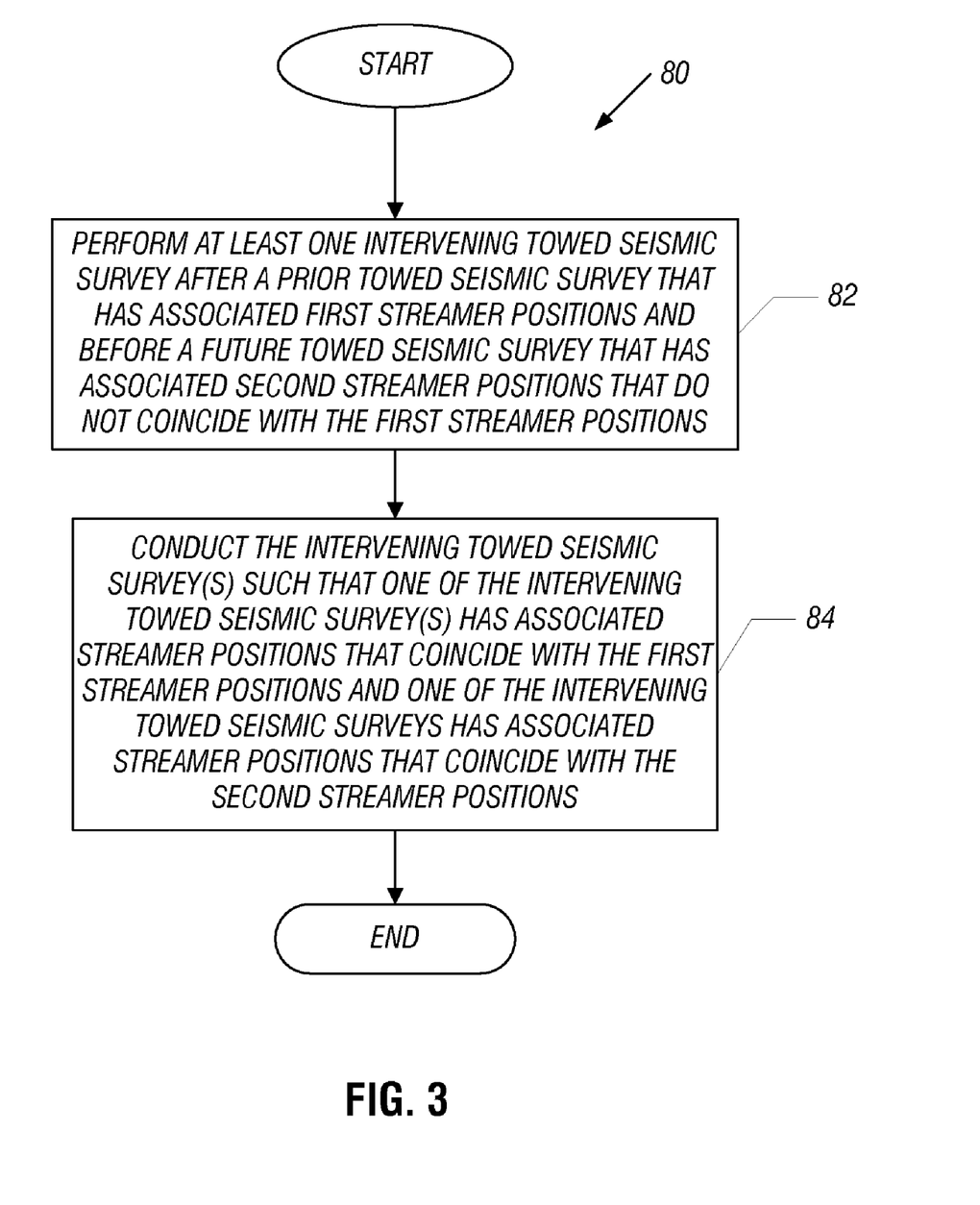

FIG. 3 depicts an example 80 of the first technique in accordance with embodiments of the invention. At least one intervening towed seismic survey is performed (block 80), and the intervening seismic survey(s) are conducted (block 84) such that streamer positions of the intervening survey(s) coincide with both the prior and future surveys. This technique takes advantage of the minimum measurement resolution of each streamer.

Figure 6:
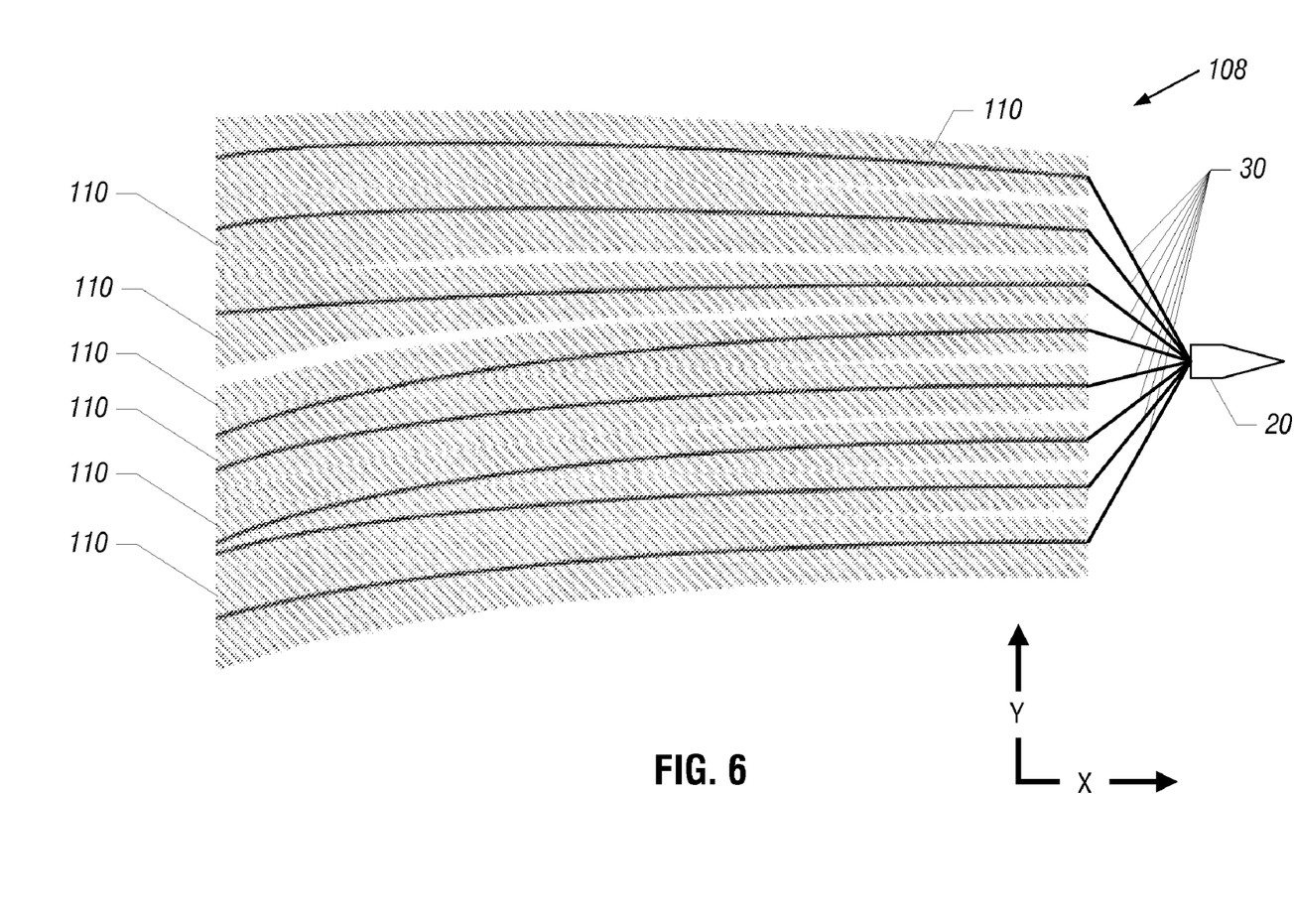
FIG. 6 is a schematic diagram illustrating zones of positive contribution associated with streamer positions of the survey of FIG. 5 according to an embodiment of the invention.

More specifically, FIG. 6 depicts an unsteered towed seismic survey 108 (i.e., a prior survey) that was conducted without streamer steering technology. As shown, the streamers 30 exhibit a significant amount of feathering during the survey. Each streamer has an associated zone 110 about the streamer 30, which delineates a minimum resolution for the streamer. In other words, the measurements that are acquired by the seismic sensors of the streamer 30 cannot be resolved in a region smaller than the associated zone 110. The zone 110 may also be referred to as a zone of positive contribution by the plane waves that form the measurements that are acquired by the seismic sensors of the streamer. The zones 110 may be Fresnel zones in accordance with some embodiments of the invention.

Figure 7:
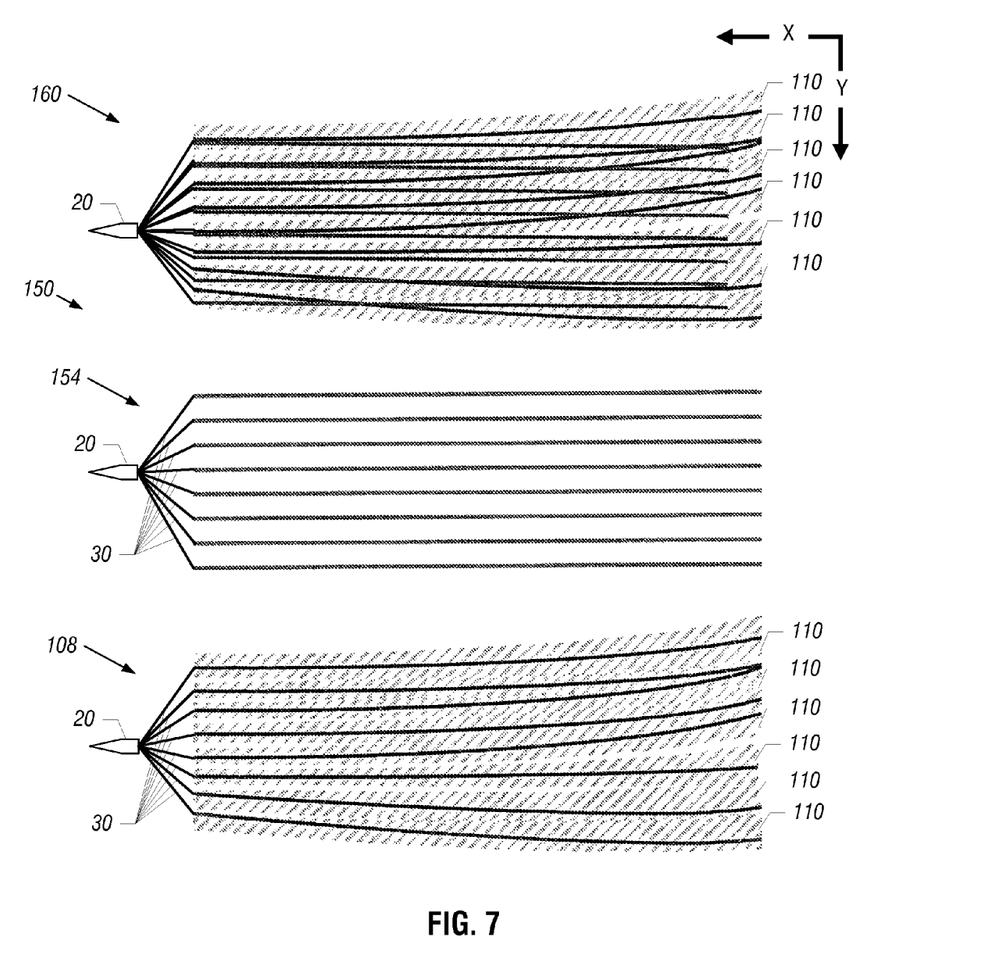
FIG. 7 is an illustration of a technique to conduct an intervening towed seismic survey to link the surveys of FIGS. 5 and 6 for purposes of time lapse analysis according to an embodiment of the invention.

The technique 80 takes advantage of the zones 110 by steering the intervening survey(s) to progressively move the streamer positions from the streamer positions associated with the unsteered prior survey to the streamer positions associated with the steered future survey. FIG. 7 illustrates application of the technique 80 for a prior survey 108 (an unsteered survey, for example) and a single intervening survey 154 (a steered survey), which has streamer positions that coincide with the future survey (a steered survey). As shown in FIG. 7, the prior survey 108 is associated with a significant degree of feathering. Each streamer 30 of the prior survey 108 has an associated zone 110 of minimum resolution. As illustrated in an overlay 160 of the surveys 108 and 154, the intervening survey 154 is steered such that the streamers 30 remain with the zones 110. Thus, the streamer positions are effectively the same for both surveys 108 and 154. Therefore, future steered surveys that resemble the survey 154 may be conducted, and due to the link that is provided by the intervening survey 154, a time lapse analysis of the producing field may be performed beginning at the time of a baseline survey (a time for example, before the survey 108) and continuing through the time for the latest steered, repeat survey.

Although FIG. 7 illustrates the use of one intervening survey, the technique 80 may be extended to multiple intervening surveys, depending on the disparity in streamer positions between the prior and future surveys. For multiple intervening surveys, the initial intervening survey is steered such that the streamer positions for the initial intervening survey fall within the zones 110 for the prior survey. The remaining intervening survey(s) may then be steered such that the steamer positions of the remaining intervening survey(s) progressively move closer to the streamer positions of the future survey, with the streamer positions of the final intervening survey coinciding with the streamer positions of the future survey (i.e., the streamer positions of the final intervening survey fall within the zones 110 of the streamers of the future survey). For each intervening survey, the streamer positions for that survey fall within the zones 110 for the immediately prior intervening survey.

As a more specific example, assume that the prior survey has a 10° feathering angle, and the future survey has a 0° feathering angle. For this example, an initial intervening survey may be conducted that has 5° feathering angle, and for this feathering angle, the streamer positions of the initial intervening survey fall within the zones 110 for the prior survey. A subsequent intervening survey may then be conducted, and the streamers of this subsequent repeat towed survey are controlled to have a zero degree feathering angle (and thus, coincide with the streamers of the future survey) while remaining within the zones 110 for the initial intervening survey. Thus, the two intervening surveys effectively form a bridge between the prior survey and the future survey. The technique 80 may likewise be extended to more than two intervening surveys.

Figure 8:
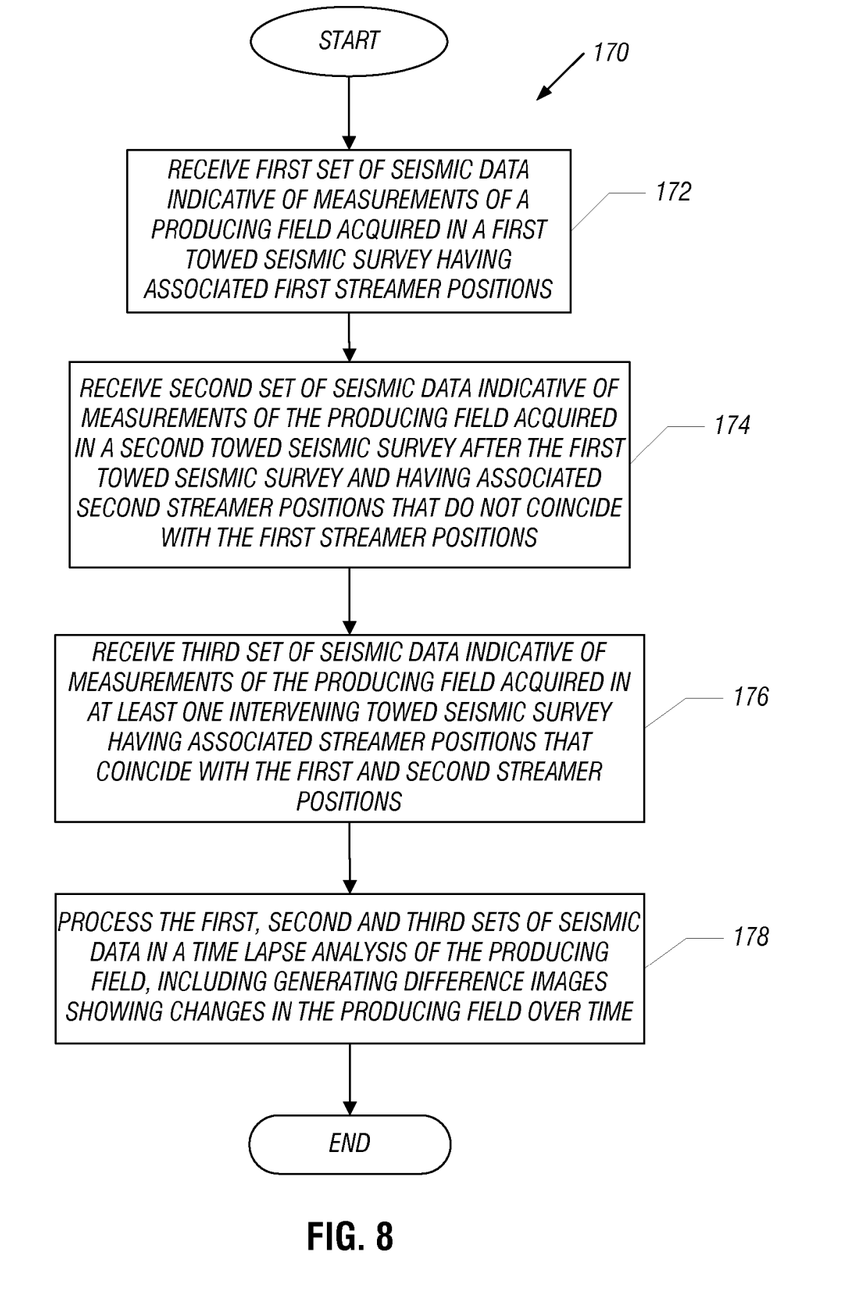

FIG. 8 depicts an exemplary technique 170 that may be used to process data that are indicative of measurements that are acquired from the above-described prior, future and intervening towed seismic surveys for purposes of performing a time lapse analysis of a producing field. The technique 170 includes receiving (block 172) a first set of seismic data that is indicative of measurements of a producing field acquired in a first towed seismic survey that has associated first streamer positions and receiving (block 174) a second set of seismic data that is indicative of measurements of the producing field acquired in a second towed seismic survey that has associated second streamer positions that do not coincide with the first streamer positions. The technique also includes receiving (block 176) a third set of seismic data that is indicative of measurements of the producing field acquired in at least one intervening towed seismic survey conducted after the first towed seismic survey and before the second towed seismic survey. The intervening towed seismic survey(s) have associated streamer positions that coincide with the first and second streamer positions. Finally, the technique 170 includes processing (block 178) the first, second and third sets of seismic data in a time lapse analysis of the producing field, including generating difference images showing changes in the producing field over time.

Figure 9:
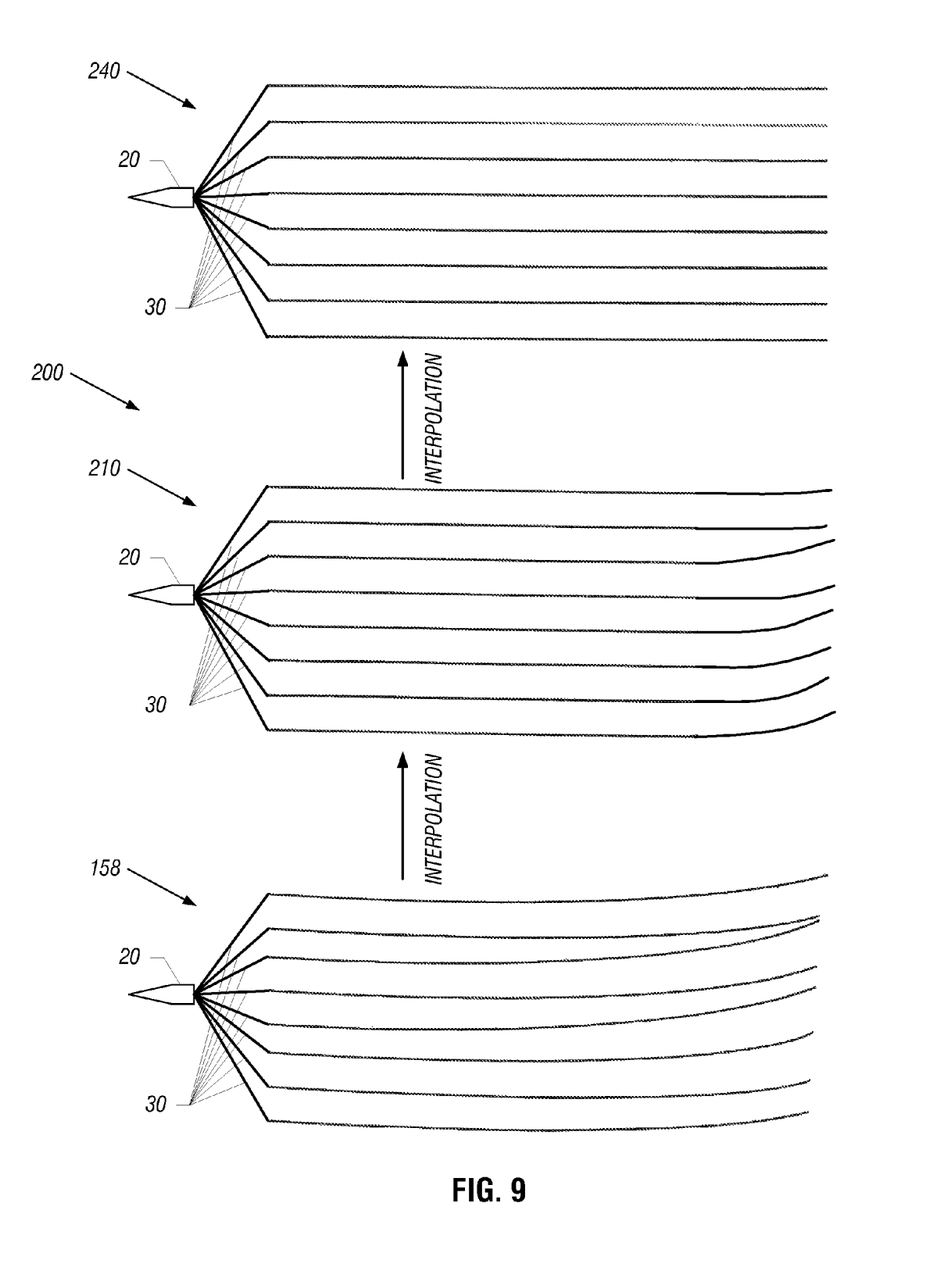
FIG. 9 is an illustration of a technique to use virtual surveys to link the surveys of FIGS. 5 and 6 for purposes of time lapse analysis according to an embodiment of the invention.

FIG. 9 is an illustration 200 of the above-mentioned second way to link prior and future towed seismic surveys by processing the measurements that are acquired by intervening survey(s) to generate virtual surveys that become part of the series of surveys for the time lapse analysis. In particular, FIG. 9 depicts the above-mentioned described prior towed seismic survey 108, which exhibits a high degree of feathering, relative to, for example, a future towed seismic survey 240 that employs steering technology and thus, exhibits a relatively lesser degree of streamer feathering, or essentially no feathering. An intervening towed seismic survey 210 of a producing field is conducted after the prior towed seismic survey 108 (which may be the last of a series of unsteered towed seismic surveys of the producing field, for example) and before the future towed seismic survey 240 (which may be the first in a series of steered towed seismic surveys of the producing field, for example).

The measurements that are acquired by the intervening survey 210 are processed to construct, for example, 1.) a virtual survey that has streamer positions that coincide with the streamer positions of the prior survey 108, as well as 2.) another virtual survey that has streamer positions that coincide with the streamer positions of the future survey 240. It is noted that in some instances, only one virtual survey may be generated, if the streamer positions of the virtual survey coincide with both surveys 108 and 240, when the associated minimum resolution zones are taken into account.

The intervening survey 210 may be more consistent with the future survey 240 relative to the prior survey 108, or vice versa.

The virtual survey is essentially a survey created from virtual streamers. The measurements acquired by the virtual seismic sensors on the virtual streamers are interpolated/extrapolated from the measurements that are acquired by actual seismic sensor measurements from the intervening survey. Examples of interpolation/extrapolation techniques for purposes of generating virtual survey measurements based on actual survey measurements may be found in U.S. patent application Ser. No. 11/568,803, filed on May 21, 2004, titled "Interpolation and Extrapolation Method for Seismic Recordings"; application Ser. No. 11/457,131, filed on Jul. 12, 2006, titled "Time Lapse Marine Seismic Surveying Employing Interpolated Multicomponent Streamer Pressure Data"; application Ser. No. 11/457,125, filed on Jul. 12, 2006, titled "Time Lapse Marine Seismic Surveying Employing Interpolated Multicomponent Streamer Pressure Data"; each of which is hereby incorporated by reference in its entirety.

Figure 10:
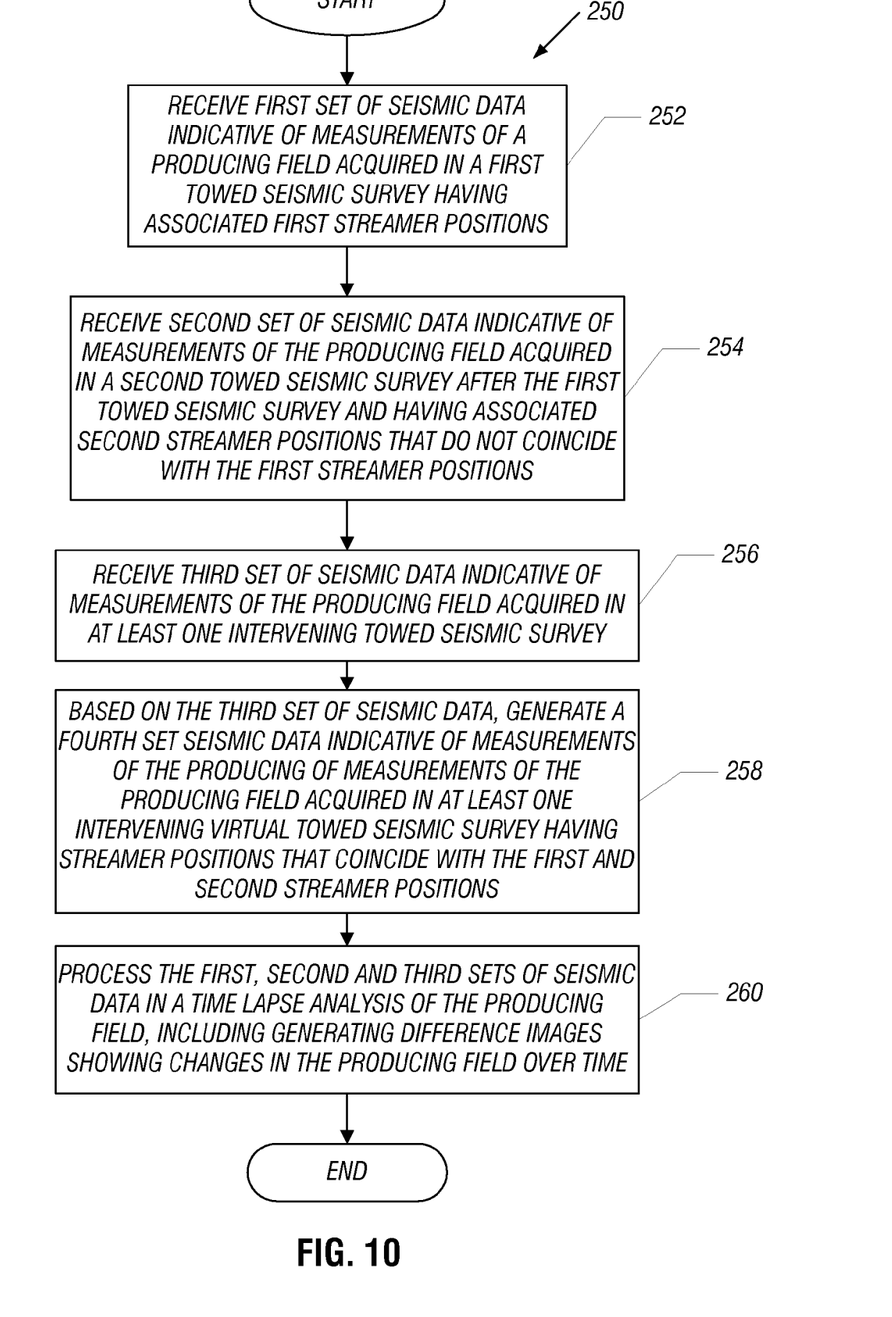

FIG. 10 depicts an exemplary technique 250 that may be used to process data that are indicative of measurements that are acquired from the above-described prior, future and intervening towed seismic surveys for purposes of performing a time lapse analysis of a producing field. The technique 250 includes receiving (block 252) a first set of seismic data that is indicative of measurements of a producing field acquired in a first towed seismic survey that has associated first streamer positions and receiving (block 254) a second set of seismic data that is indicative of measurements of the producing field acquired in a second towed seismic survey after the first towed seismic survey. The second towed seismic survey has associated second streamer positions that do not coincide with the first streamer positions. The technique 250 also includes receiving (block 256) a third set of seismic data that is indicative of measurements of the producing field acquired in at least one intervening towed seismic survey.

The technique 250 includes, based on the third set of seismic data, generating (block 258) a fourth set of seismic data that is indicative of measurements of the producing field acquired in one or more intervening virtual towed seismic surveys that have streamer positions that coincide with the first and second streamer positions. The first, second and fourths sets of seismic data are processed (block 260) in a time lapse analysis of the producing field, including generating difference images showing changes in the producing field over time.

In other embodiments of the invention, the configurations (survey azimuth, streamer spacing, etc.) for the base and repeat surveys do not need to be the same. This a common occurrence, for example, when a field has been in production for quite some time, and the base survey may have been acquired with wider streamer spacing and/or somewhat different shooting directions. A change in shooting direction may result from practical considerations, such as (as examples) an attempt to minimize streamer feathering, a better understanding of the optimal acquisition direction to image the reservoir, or an attempt to avoid surface installations constructed after the base survey.

The 4-D noise that is introduced by the different configurations may be significant and may result in significant limitations in the applicability of the 4-D analysis. In this case, the base survey and each subsequent repeat survey may be acquired in such a way that the azimuth is gradually changed to an optimal, final azimuth. In the case of full wavefield acquisition using interpolation/extrapolation, a backward looking data set extracted at a slant is used with a backward looking difference analysis, and the forward looking analysis uses the optimal, final azimuth. The range of azimuths that may be accommodated depends on the required frequency content, the ability to interpolate/extrapolate and other practical issues.

The techniques described herein may also be used when the change in streamer separation between successive surveys is not an integer. For example, if a base survey is acquired with a 100 meter (m) streamer separation and a repeat survey is acquired at a 50 m streamer separation, then it is relatively straight forward to decimate the denser sampling back to the base line density to observe the improvement (if any) in repeatability that this may provide. However, if the ratio is not a relatively simple one and there are no or limited actually coincident notational streamer (for example, 100 m base line and 37.5 repeat separations), then the full wavefield interpolation approach may be used to enable a 100 m separation backward looking subset to be extracted from the 37.5 m repeat survey.

Referring to FIG. 10, in accordance with some embodiments of the invention, a processing system 320 may perform at least part of the techniques that are disclosed herein. In accordance with some embodiments of the invention, the system 320 may include a processor 350, such as one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving data that corresponds to actual base survey measurements, actual repeat survey measurements, virtual survey measurements, etc. Thus, in accordance with embodiments of the invention described herein, the processor 350, when executing instructions stored in a memory of the seismic data processing system 320, may receive actual/virtual seismic survey data. It is noted that, depending on the particular embodiment of the invention, the data may be data that is directly received from the seismic sensors as the data is being acquired (for the case in which the processor 350 is part of the survey system, such as part of the vessel or streamer) or may be data that was previously acquired by the seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various data sets involved with the techniques 170 and/or 250, as indicated by reference numeral 348. The memory 340 may store program instructions 344, which when executed by the processor 350, may cause the processor 350 to perform one or more of the techniques that are disclosed herein, such as the techniques 170 and/or 250 (as examples), as indicated by reference numeral 348 and display results obtained via the technique(s) on a display (not shown in FIG. 12) of the system 320, in accordance with some embodiments of the invention. For example, the display may depict time lapse different images, streamer paths for different surveys, virtual surveys, etc.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    receiving a first set of seismic data indicative of measurements of a producing field acquired in a first towed seismic survey having associated first streamer positions;
    receiving a second set of seismic data indicative of measurements of the producing field acquired in a second towed seismic survey having associated second streamer positions that do not coincide with the first streamer positions;
    receiving a third set of seismic data indicative of measurements of the producing field acquired in at least one intervening towed seismic survey conducted after the first towed seismic survey and before the second towed seismic survey, said at least one intervening towed seismic survey having associated streamer positions that coincide with the first and second streamer positions; and
    processing the first, second and third sets of seismic data in a time lapse analysis of the producing field.

2. The method of claim 1, wherein the first towed seismic survey comprises a survey in which streamer steering is not employed, and the second towed seismic survey comprises a survey in which streamer steering is employed.

3. The method of claim 1, wherein said at least one intervening towed seismic survey comprises multiple intervening towed seismic surveys, and the streamer positions associated with said at least one intervening towed seismic survey comprise streamer positions associated with the multiple intervening towed seismic surveys.

4. A method comprising:
    performing at least one intervening towed seismic survey after a prior towed seismic survey having associated first streamer positions and before a future towed seismic survey having associated second streamer positions that do not coincide with the first streamer positions; and
    using measurements acquired in said at least one intervening towed seismic survey to link the prior towed seismic survey to the future towed seismic survey for time lapse analysis involving the prior and future towed seismic surveys, wherein
    the first streamer positions are associated with minimum resolution zones,
    second streamer positions are not substantially located within the zones, and
    the act of performing said at least one intervening towed seismic survey comprises conducting said at least one intervening towed seismic survey such that said at least one intervening towed seismic survey has streamer positions that are located within the zones.

5. The method of claim 4, wherein the prior towed seismic survey comprises a survey in which streamer steering is not employed, and the future towed seismic survey comprises a survey in which streamer steering is employed.

6. The method of claim 4, wherein the act of using the measurements acquired in said at least one intervening towed seismic survey comprises:
    based on the measurements, generating at least one virtual survey having streamer positions that coincide with the prior towed seismic survey and streamer positions that coincide with the future towed seismic survey.

7. A method comprising:
    receiving a first set of seismic data indicative of measurements of a producing field acquired in a first towed seismic survey having associated first streamer positions;
    receiving a second set of seismic data indicative of measurements of the producing field acquired in a second towed seismic survey having associated second streamer positions that do not coincide with the first streamer positions;

receiving a third set of seismic data indicative of measurements of the producing field acquired in at least one intervening towed seismic survey conducted after the first towed seismic survey and before the second towed seismic survey, said at least one intervening towed seismic survey having associated streamer positions that coincide with the first and second streamer positions; and processing the first, second and third sets of seismic data in a time lapse analysis of the producing field, wherein the first streamer positions are associated with minimum resolution zones, second streamer positions are not substantially located within the zones, and the streamer positions associated with the third set of seismic data coincide with the first and second streamer positions.

8. The method of claim 7, wherein the first towed seismic survey comprises a survey in which streamer steering is not employed, and the second towed seismic survey comprises a survey in which streamer steering is employed.

9. The method of claim 7, wherein said at least one intervening towed seismic survey comprises multiple intervening towed seismic surveys, and the streamer positions associated with said at least one intervening towed seismic survey comprise streamer positions associated with the multiple intervening towed seismic surveys.

10. A method comprising:

obtaining a first set of seismic data indicative of measurements acquired in at least one intervening towed seismic survey conducted after a prior towed seismic survey having associated first streamer positions and before a future towed seismic survey having associated second streamer positions that do not coincide with the first streamer positions; and processing the first set of seismic data to generate a second set of seismic data indicative of measurements acquired in at least one virtual towed seismic survey having associated streamer positions that coincide with the first and second streamer positions, wherein the first streamer positions are associated with minimum resolution zones, second streamer positions are not substantially located within the zones, and the streamer positions associated with the third set of seismic data coincide with the first and second streamer positions.

11. The method of claim 10, wherein said at least one virtual towed seismic survey comprises multiple intervening towed seismic surveys, and the streamer positions associated with said at least one virtual towed seismic survey comprise streamer positions associated with the multiple intervening towed seismic surveys.

12. The method of claim 10, wherein the prior towed seismic survey comprises a survey in which streamer steering is not employed, and the future towed seismic survey comprises a survey in which streamer steering is employed.

* * * * *